United States Patent
Ma et al.

(10) Patent No.: US 9,858,186 B2
(45) Date of Patent: *Jan. 2, 2018

(54) CONDITIONAL DATA CACHING TRANSACTIONAL MEMORY IN A MULTIPLE PROCESSOR SYSTEM

(71) Applicant: Alibaba Group Holding Limited, Grand Cayman (KY)

(72) Inventors: Ling Ma, Hangzhou (CN); Lei Zhang, Hangzhou (CN); Sihai Yao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/619,886

(22) Filed: Jun. 12, 2017

(65) Prior Publication Data

US 2017/0277635 A1    Sep. 28, 2017

Related U.S. Application Data

(63) Continuation of application No. 14/668,681, filed on Mar. 25, 2015, now Pat. No. 9,715,450.

(30) Foreign Application Priority Data

Mar. 26, 2014  (CN) .......................... 2014 1 0117556

(51) Int. Cl.
  *G06F 12/0811*  (2016.01)
  *G06F 9/46*    (2006.01)
  *G06F 12/0808*  (2016.01)

(52) U.S. Cl.
  CPC .......... *G06F 12/0811* (2013.01); *G06F 9/467* (2013.01); *G06F 12/0808* (2013.01); *G06F 2212/283* (2013.01)

(58) Field of Classification Search
  None
  See application file for complete search history.

(56) References Cited

U.S. PATENT DOCUMENTS 6,192,451 B1 * 2/2001 Arimilli .............. G06F 12/0831
                                          711/122
6,868,485 B1   3/2005 Conway
          (Continued)

FOREIGN PATENT DOCUMENTS

EP          0438211 A2       7/1991

OTHER PUBLICATIONS

Lai et al., "Selective, Accurate, and Timely Self-Invalidation Using Last-Touch Prediction," Proceedings of the 27th International Symposium on IEEE, 2000, 10 pages.
(Continued)

*Primary Examiner* — Charles Rones
*Assistant Examiner* — Hewy Li
(74) *Attorney, Agent, or Firm* — Lee & Hayes, PLLC

(57) ABSTRACT

A multiprocessor system providing transactional memory. A first processor initiates a transaction which includes reading first data into a private cache of the first processor, and performing a write operation on the first data in the private cache of the first processor. In response to detecting that prior to the write operation the first data was last modified by a second processor, the first processor writes the modified first data into a last level cache (LLC) accessible by the multiple processors. The system sets a cache line state index string to indicate that the first data written into the LLC was last modified by the first processor, invalidates the first data in the private cache of the first processor, and commits the transaction to the transactional memory system. This allows more efficient accesses to the data by the multiple processors.

20 Claims, 7 Drawing Sheets

(56) References Cited

U.S. PATENT DOCUMENTS

| | | |
|---|---|---|
| 2006/0236037 A1 | 10/2006 | Guthrie et al. |
| 2007/0143550 A1 | 6/2007 | Rajwar et al. |
| 2008/0104332 A1 | 5/2008 | Gaither et al. |
| 2009/0138890 A1 | 5/2009 | Blake et al. |
| 2009/0276573 A1 | 11/2009 | Frank et al. |
| 2010/0169579 A1 | 7/2010 | Sheaffer et al. |
| 2010/0332538 A1 | 12/2010 | Gray et al. |
| 2011/0153960 A1 | 6/2011 | Rajwar et al. |
| 2013/0254488 A1 | 9/2013 | Kaxiras et al. |
| 2014/0075124 A1 | 3/2014 | Blundell et al. |
| 2015/0278094 A1 | 10/2015 | Ma et al. |

OTHER PUBLICATIONS

Lebeck et al., "Dynamic Self-Invalidation: Reducing coherence Overhead in Shared-Memory Multiprocessors," ACM SIGARCH Computer Architecture News. vol. 23., No. 2., 1995, 12 pages.
Mukherjee et al., "Using Prediction to Accelerate Coherence Protocols," IEEE Computer Society, ACM SIGARCH Computer Architecture News, vol. 26., vol. 3., 1998, 12 pages.
Office action for U.S. Appl. No. 14/668,681, dated Dec. 1, 2016, Ma et al., "Method and Processor for Processing Data," 19 pages.
PCT Search Report and Written Opinion dated Jun. 25, 2015 for PCT Application No. PCT/US15/22507, 10 pages.
Extended European Search Report dated Sep. 21, 2017 for European Patent Application No. 15769090.0, 9 pages.

\* cited by examiner

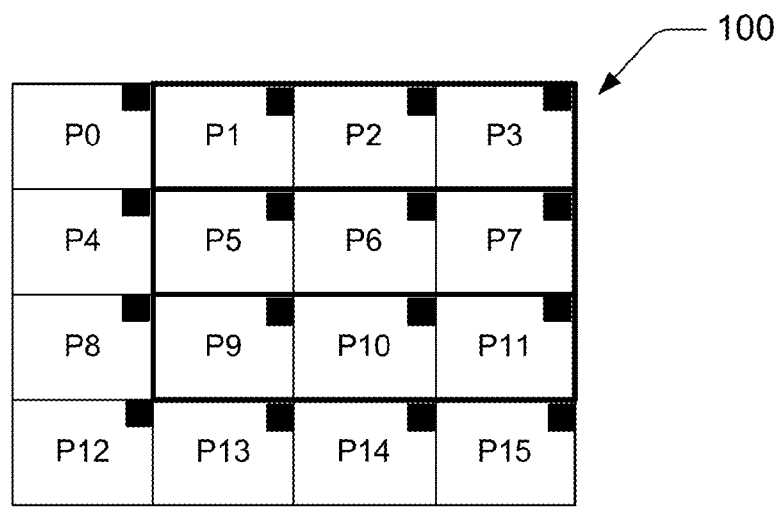
Fig. 1A
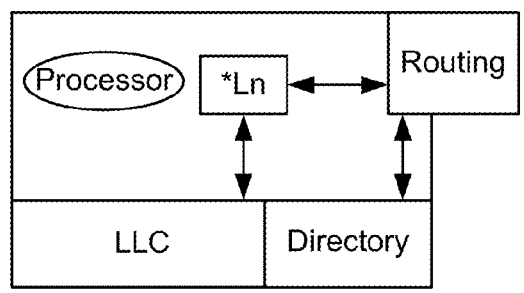
Fig. 1B
| Tag | State | P0 | P1 | ...... | Pn−1 |
Fig. 2

| Tag | Modified | 0(P0) | 1(P1) | ...... | 0(Pn−1) |

| Tag | Shared | 1(P0) | 1(P1) | ...... | 0(Pn−1) |

Fig. 6

| Tag | Modified | 1(P0) | 0(P1) | ...... | 0(Pn−1) |

Fig. 7

| Tag | Modified & Exclusive | 1(P0) | 0(P1) | ...... | 0(Pn−1) |

Fig. 9

| Tag | Modified & Shared | 0(P0) | 1(P1) | ...... | 0(Pn−1) |

| Tag | Modified & Exclusive | 0(P0) | 1(P1) | ...... | 0(Pn−1) |

CONDITIONAL DATA CACHING TRANSACTIONAL MEMORY IN A MULTIPLE PROCESSOR SYSTEM

RELATED PATENT APPLICATIONS

This application is a continuation of and claims priority to U.S. patent application Ser. No. 14/668,681, filed on Mar. 25, 2015, the disclosure of which claims foreign priority to Chinese Patent Application No. 201410117556.9 filed on Mar. 26, 2014, entitled "METHOD AND PROCESSOR FOR PROCESSING DATA," Chinese Patent Application is hereby incorporated by reference in its entirety.

TECHNICAL FIELD

This application relates to computer technologies, and particularly to methods and processors for data processing.

BACKGROUND

Computer technologies continue to develop in the direction of multicore computing, due to power consumption and thermal performance concerns, and the need to continue the trend of high performance computing. To optimize the use of the multicore architecture, an application program is often divided into multiple threads each run separately on a single core (processor) to realize parallel computing with higher computing efficiency.

FIGS. 1A and 1B show a schematic design of an existing multicore architecture. FIGS. 1A has 16 CPU cores P1. P2, . . . P16, interconnected using a routing system (represented by thicker lines) to allow inter-core visiting among the cores. FIG. 1B shows a schematic structure of each CPU core with caches *Ln and LLC, where *Ln represents First Level Cache (L1) and/or Second Level Cache (L2), while LLC stands for Last Level Cache. *Ln and LLC are connected through the routing system, and LLC has a directory which is also connected through the routing system. As the processors read out data from a memory (not shown), the data may be distributed among the caches of the multiple cores (processors).

In order to keep the data synchronized, different threads may need to be managed by a synchronization mechanism to access shared regions, which traditionally required a serial access by multiple threads. Transactional memory design has been introduced to increase the level of parallelism. Transactional memory handles computing by dividing the program into many transactions and processing each transaction separately. During the processing of each transaction, the state of the transaction is hidden from and unaffected by the other processors. After the transaction is processed, the results are then committed to the global system. Instead of assuming "pessimistically" that different threads will clash and therefore locks are required, transactional memory takes a more "optimistic" approach in assuming that different threads will generally not clash unless a clash is detected. When a clash is detected, the state of the program can be rolled back to the state before the clash, thus maintaining the data integrity. Transactional memory is presently used in CPU architectures, including Blue Gen of IBM and Haswell of Intel.

Transactional memory can be realized in two different ways, either using software or hardware. Software transactional memory suffers low efficiency and low speed, while hardware transactional memory has significantly increased the usefulness of the technology. This disclosure is directed to hardware transactional memory.

Transactional memory assumes that among multicore threads, visitations of shared data rarely cause write-read, read-write, and write-write conflicts, and therefore multiple threads are allowed to run in parallel. By hiding modified states of the data during a transaction, and rolling back upon a conflict, the system performance and scalability are increased without sacrificing data integrity.

Although transactional memory increases the parallelism of multicore systems, the collision rate increases as the level of parallelism increases to cause an excessive amount of rolling back which may have a large negative impact on the program performance.

Theoretically, the pre-invalidation technique may improve the execution of critical regions by significantly reducing conflicts when modifying shared data. However, the pre-invalidation technique requires that the global data state be changed. If the pre-invalidation is directly applied to the existing transactional memory design, it would directly contradict with the transactional memory design, which requires that state being hidden during modification. Pre-validation and transactional memory therefore cannot be simply combined.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One aspect of this disclosure is a method for providing transactional memory in a multiprocessor system. The method uses a first processor to initiate a transaction, which may include reading first data into a private cache of the first processor, and performing a write operation on the first data in the private cache of the first processor. In response to detecting a preset condition of recent modifications of the first data prior to the write operation, the first processor writes the modified first data into a last level cache (LLC) accessible by the multiple processors. The system sets a cache line state index string to indicate that the first data written into the LLC was last modified by the first processor. The system further invalidates the first data in the private cache of the first processor, and commits the transaction to the transactional memory system.

The preset condition of recent modifications may be that, prior to the write operation, the first data was last modified by a second processor different from the first processor.

The method may further set a cache line state index string to indicate that the first data written into the LLC was last modified by the first processor. The method may also set a cache line state index string to indicate a special state of the first data written in the LLC, where the special state signals that the first data written in the LLC is modified (and therefore updated) and that the first data in the private cache of the first processor has been invalidated.

Another aspect of this disclosure is a computing system for providing transactional memory. The computer system includes a plurality of processors including at least a first processor and a second processor, a plurality of private caches each accessible by a respective one of the plurality of processors, and a last level cache (LLC) shared among the plurality of processes. The computing system is programmed to perform the functions of the disclosed method.

The improved transactional memory design according to the present disclosure uses a predictive mechanism to allow the data in the transactional memory to be conditionally placed in LLC instead of in private cache lines, and to also pre-invalidate the corresponding private cache lines. This results in more efficient access to such data by the multiple processors. The disclosed design can be applied in existing transactional memory systems to improve them. A simple predictive mechanism makes possible a seamless combination of pre-invalidation and hardware transactional memory, to result in higher prediction accuracy and efficiency of executing critical regions by transactional memory. Rolling backs caused by data conflicts while running transactional memory are reduced, and the multicore system performance and scalability are increased.

Other features of the present disclosure and advantages will be set forth in the following description, and in part will become apparent from the description, or understood by practice of the application. Purposes of this application and other advantages can be obtained by the written description, claims, and drawings of the structure particularly pointed out realized and attained.

BRIEF DESCRIPTION OF THE FIGURES

FIG. 1A is a schematic diagram of multiple processors of a multicore parallel computing system.

FIG. 1B is a schematic diagram of the structure of each core (processor).

FIG. 2 is a schematic diagram of a data state index string in a directory of the last level cache (LLC).

FIG. 6 is a block flow diagram of a cache line's data state index string in the directory of LLC at block 104 of the first process of an example embodiment.

FIG. 7 is a block flow diagram of a cache line's data state index string in the directory of LLC at block 110 of the first process of an example embodiment.

FIG. 9 is a block flow diagram of a cache line's data state index string in the directory of LLC at block 210 of the second process of an example embodiment.

DETAILED DESCRIPTION

Figures 3, 4:
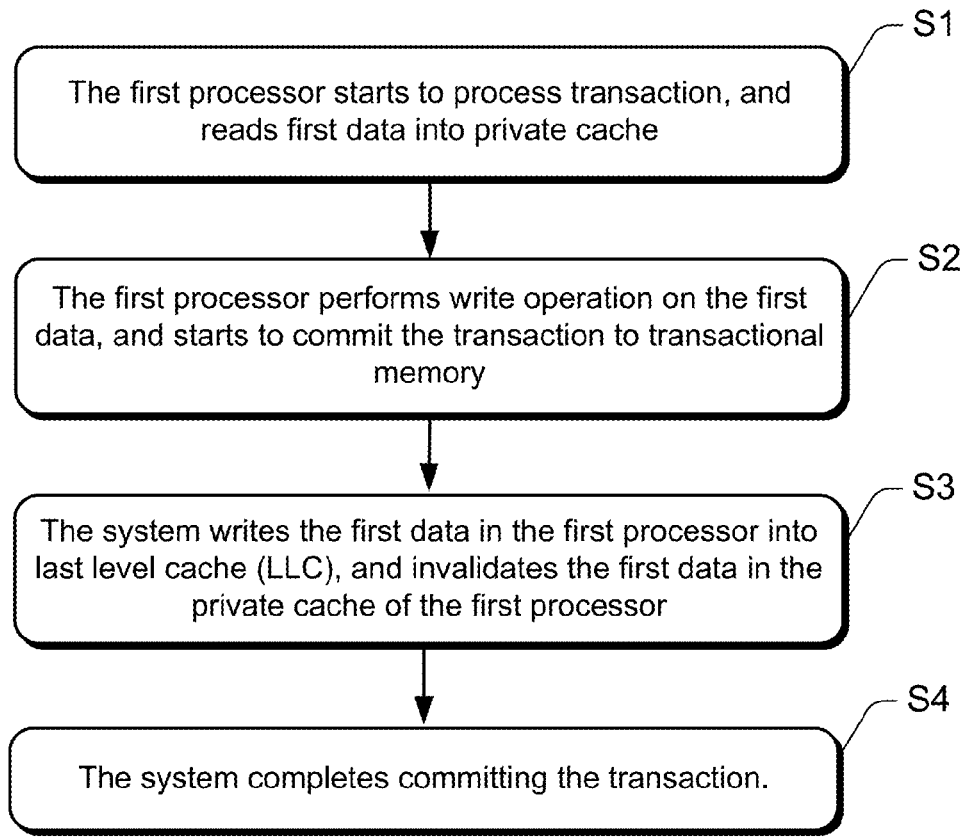
FIG. 3 is a block flow diagram of an example embodiment of the disclosed method for data processing.
FIG. 4 is a schematic diagram of a cache line's data state index string in the directory of LLC in the beginning of a first process of the example embodiment.

The present disclosure is described in further detail in conjunction with accompanying figures and example embodiments. In the description, the term "technique(s)," for instance, may refer to a method, an apparatus device, a system, and/or computer-readable instructions as permitted by the context above and throughout the present disclosure.

In this description, the order in which a process is described is not intended to be construed as a limitation, and any number of the described process blocks may be combined in any order to implement the method, or an alternate method. An embodiment is described in sequential steps only for the convenience of illustration. Unless it would cause a conflict, the examples and embodiments described in the present disclosure, and the characteristics and features thereof, may be combined freely. Further, not every step described in the embodiments is required in order to practice the techniques of this disclosure.

In the typical configuration, a multicore system includes multiple processors (CPUs), one or more I/O interfaces, network interface and memory. Memory may include a computer-readable medium such as a volatile memory, random access memory (RAM) and/or other forms of nonvolatile memory, such as read only memory (ROM) or flash memory (flash RAM). The internal memory of a computing device is a type of computer-readable memory medium. Processors have built-in cache memories.

The computer-readable media include permanent and non-permanent, removable and non-removable media, and may be formed in any method or technology for storage of information. Information stored may be a set of computer-readable instructions, data structures, program modules or other data. Examples of the computer storage media include, but are not limited to, phase-change memory (PRAM), a static random access memory (SRAM), dynamic random access memory (DRAM), other types of random access memory (RAM), read-only memory (ROM), electrically erasable programmable read-only memory (EEPROM), flash memory or other memory technology, CD-ROM read-only memory (CD-ROM), digital versatile disc (DVD) or other optical storages, magnetic cassettes, magnetic tape disk storage or other magnetic storage devices, or any other non-transmission medium that may be used to store information accessible by a computing device. According to the definitions of the present disclosure, computer-readable media do not include temporary computer readable media (transitory media), such as a modulated data signal and a carrier wave.

In the following, the operating principles of existing hardware transactional memory are first described.

In the existing hardware transactional memory, a program code tells the CPU where the start and the end of a transaction region are, using instructions such as Transaction_start and Transaction_end. In between the start and the end is a transaction region for execution. Once the execution of the transaction region is done, the Transaction_end instruction asks the CPU to commit the modified data atomically, meaning that the process of committing is not interrupted nor visited. During the execution of the transaction, all memory regions which have experienced a read operation or a write operation are monitored to avoid write-read, read-write, and write-write conflicts, and to ensure that while executing a transactional memory process, a copy of the original data prior to every write operation is kept. For example, a cache line may be copied into a corresponding invisible private cache (e.g., a first level cache L1), and any subsequently written data of the cache line is kept in the invisible private cache. In case of a conflict, the modified data in the invisible private cache (e.g.

L1) is abandoned. If the transaction is successful, the modified data in the invisible private cache (e.g., L1) replaces the original data.

There are two common ways to maintain the consistency and coherency of the cache data, namely broadcast and directory. Broadcast method is more suitable for architectures of relatively small number of cores, while the directory method has strong scalability and is more suitable for larger multicore systems. The present disclosure primarily uses the directory method as a basis for illustration, although the techniques disclosed are also suitable for the broadcast method in principle.

As shown in FIG. 2, every cache line has a data state index string of multiple bit locations in a LLC directory. In FIG. 2, the bit location "TAG" is an index marker of the cache line in the directory, usually located at the upper bits of the cache line data. "STATE" is the data state indicator, which can be any one of Exclusive, Modified, Shared, and Invalid states. In a shared state, data is distributed to the private caches of one or more processors. Data indicator bits P0, P1, ... Pn-1 each corresponds to n processors CPU1, CPU2, ... CPUn-1. When a CPU has the distributed data of the cache line, the respective data indicator bit has a value "1", and when the CPU does not have the distributed data of the cache line, the respective data indicator bit has a value "0". If the cache line is at a "Modified" state, only one CPU (processor) would have the updated data. That is, only one data indicator bit in the data state index string will have the value "1", and all other data indicator bits have the value "0".

Every write operation would require that the cache line's state (which can be any one of the above listed four states) be changed to the state of "Modified". In changing the state to "Modified", the system sends out a request to all CPUs that have a copy of the original data to invalidate the data. That is, the data of the private cache of each corresponding CPU is instructed to be invalidated, and the data indicator bit in the cache line corresponding to the CPU is set to "0", to make the new modified in the private cache of the CPU the only valid data. After this process, other CPUs, when need to read modified data, will all need to read the data from the only CPU that has the new modified data. As the number of CPUs increase, the time to read the modified data also increases rapidly. Every reading of modified data in a critical region of transactional memory, and every submitting of the modified data, involves this slowing process. The purpose of the method disclosed herein is to make this process faster, and to increase the parallel computing time and reduce the collision rate.

FIG. 3 is a block flow diagram of an example embodiment of the disclosed method for data processing.

At block S1, a first processor (e.g., P1) starts to process a transaction. A transaction is defined by a marked region in a program, and usually involves at least reading a first data from a memory of the system into a private cache of the processor. A transaction may often also involve a write operation on data. For the sake of simplicity, assume the write operation is done upon the first data which was just read to the private cache of the processor.

At block S2, as part of the processing the transaction, the first processor performs a write operation on the first data in the private cache. After the write operation is done, the first processor may start to commit the result of the transaction to the transactional memory system as described the next.

At block S3, the system starts to commit the transaction. In response to detecting that prior to the write operation the first data was last modified by a second processor different from the first processor, the system writes the first data in the private cache of the first processor into a last level cache (LLC) accessible by the multiple processors. The system further sets a cache line state index string to indicate that the first data written into the LLC was last modified by the first processor, and invalidates the first data in the private cache of the first processor.

One important aspect of the present disclosure is that depending on the condition of the recent modifications made to the first data prior to performing a write operation on the first data, the system handles the modified data differently in the cache memories of the processors. If the system predicts, based on the last modifications to the data, that the modified data is more likely to be read by other processors, the system commits the modified data to the LLC of the processors instead of to the private cache of the current processor which just made the modification to the data. In the example illustrated at the above-described block S3, the prediction is simply based on detecting that, prior to the write operation, the first data was last modified by a second processor different from the first processor. However, it is understood that any condition based on a meaningful prediction that moving the modified data to the LLC could result in an overall benefit to the efficiency of transactional memory can be used.

Each data corresponds to a cache line in the transactional memory. The corresponding cache line's data state index string in the LLC directory tells which processor made last modification to the data. If it is the present processor (the first processor in this example), existing transactional memory schemes may be used. Specifically, the modified data may be kept in the private cache of the present processor. But if it is another processor that made the modification to the present data (the first data in this example), as illustrated in FIG. 3, after the write operation by the current processor, the modified data is written into the LLC. Meanwhile, the data in the private cache of the present processor is invalidated, which has an effect of pre-invalidation resulting in a higher efficiency, yet at the same time is done selectively based on a predictive condition, such that the pre-invalidation is not used blindly to negate the benefits of transactional memory.

In other words, for a cache line that meets the predictive condition, because its corresponding modified data is saved in LLC, instead of in the present processor, and further because the data in the present processor is invalidated when the modified data is committed, any subsequent modification to this particular data will be done on the copy that is kept the LLC, thus avoiding data traffic between the processors, and increasing the transactional memory system performance. Furthermore, using the disclosed method, the scalability of the system is improved, because the reading time of the modified data saved in LLC does not rapidly increase with the number of processors.

The method described herein may be either pre-implemented directly into the logics of the processors to be carried out automatically in the operation of the processors, or implemented using additional coding in the application software that is to be executed by the processors. In the latter scenario, the method described herein is carried out by instructing the processors perform the necessary functions using the additional coding.

In some embodiments, when performing the write operation on the first data, the method sets a cache line state index string to indicate a special state of the first data written in the private cache of the first processor, in response to detecting that a different processor made the last modification on the first data prior to the write operation. The special state signals that the first data is modified and is to be exclusively written in the LLC when the transaction is committed. The designation of a special state is to serve as an efficient signal to coordinate the transactional memory. The special state should be different from any commonly used states, such as modified, exclusive, shared, or invalid. One example of a special state is "Modified & Exclusive", which indicate that the data is modified, and has an exclusive or unique feature as compared to other modified data as well. If it is detected that the same processor (the first processor in this example) made the last modification to the first data prior to the write operation, the method sets a cache line state index string to indicate a "Modified" state of the first data written in the private cache of the first processor. This is consistent with common transactional memory designs.

Accordingly, when committing the modified data of the transaction, the method sets the state of the modified first data in the LLC directory to be a special state as well, in response to seeing that the first data in the private cache of the first processor is in the special state. For example, the state of the modified first data in the LLC directory may be set to be "Modified & Exclusive", to indicate that the first data in the LLC is in a modified estate, and also has an exclusive or unique feature as compared to other modified data.

At block S4, the submitting the transaction is complete.

In summary, if the system sees that the first data was last modified by the same processor currently making a write operation, it treats the modified first data using a common transactional memory method. But if the system sees that a predictive condition is met (e.g., that the first data was last modified by a different processor), the system sets the state of the modified data to be a special state (e.g., "Modified & Exclusive") to indicate a special treatment by moving the modified data to the LLC. With this design, any subsequent transaction is clearly notified that the data has been written into LLC, and the corresponding data that was in the first processor (which made the last written operation on the first data) has already been invalidated.

Transaction processing as described above (including block S1) may further include the sub-blocks, as described below in two different scenarios.

The first scenario is when the current first data is in a normal "Modified" state, which requires no special treatment.

At sub-block S11 (not shown), the first processor starts to process the transaction. If the first data is not found in the private cache, the system visits the LLC directory to find the needed first data according to an address mapping.

At sub-block S12 (not shown), the system obtains the state of the first data according to the first state index string in the LLC directory corresponding to the cache line of the first data. If the state is "Modified", the process proceeds to sub-block S13.

At sub-block S13 (not shown), the system determines, based on a data indicator bit in the first data indicator string, the identity of the processor which last modified the first data. If it is a second processor, the system reads the first data from a private cache of the second processor to the LLC, and changes the first data's state in the LLC directory to "Shared". If it is the first processor, the process proceeds to block S2 of FIG. 3 directly, and skips the following sub-block S14, to perform a write operation on the first data in the private cache of the first processor. In this case, because the state of the first data is a regular "Modified" state, instead of a special "Modified & Exclusive" state, the modified first data is kept in the private cache of the first processor.

At sub-block S14 (not shown), which continues from sub-block S13 in which the modified first data in a private cache of a second processor has been read into the LLC, the system then reads the first data from the LLC into a private cache of the first processor, and set the value of the data indicator bit in the first state index string corresponding to the first processor to "1".

The above described sub-block S13 represents a transactional memory process in which the state of the first data is a regular state "Modified", instead of a special state such as "Modified & Exclusive". This scenario happens when the first data was not previously processed using a special improved transactional memory method disclosed herein. At the point before sub-block S13 is carried out, if the most updated first data is kept at a second processor, then for the first processor to read the first data, the system needs to first read the first data from the second processor into the LLC. In this scenario, after the first processor has performed the write operation on the first data, the first data in the second processor should be invalidated.

It is noted that, like many other steps or blocks described herein, sub-block S14 and the step of changing the state of the first data to "Shared" do not require any particular order when performed, and may be performed simultaneously.

The second scenario is when the current first data is in a special state "Modified & Exclusive", which receives a different treatment.

At sub-block S11' (not shown), the first processor starts to process the transaction. If the first data is not found in the private cache, the system visits the LLC directory according to an address mapping to find the needed first data.

At sub-block S12' (not shown), the system obtains the state of the first data according to the first state index string in the LLC directory corresponding to the cache line of the first data. If the state is "Modified & Exclusive", the process proceeds to sub-block S13'.

At sub-block S13' (not shown), the system changes the state of the first data in the LLC directory to "shared and modified" to indicate that the first data which was in the special state "Modified & Exclusive" is now shared at the first processor.

At sub-block S14' (not shown), because based on the special state "Modified & Exclusive" of the first data, the system knows that the modified first data is already in the LLC. The system therefore reads the first data from the LLC into a private cache of the first processor, and set the value of the data indicator bit in the first state index string corresponding to the first processor to "1".

It is noted that, like many other steps or blocks described herein, sub-block S13' and sub-block S14' do not require any particular order when performed, and may be performed simultaneously.

The above described sub-block 13' represents a transactional memory process in which the state of the first data is a special state "Modified & Exclusive". This scenario happens when the first data was already previously processed using a special improved transactional memory method disclosed herein. At the point before sub-block 13' is carried out, the most updated first data is kept in the LLC. For the first processor to read the first data, the system must reads the first data from the LLC into the first processor. In this scenario, after the first processor has read the first data from the LLC, the state of the first data should be changed to "Modified & Shared" to differentiate from a regular "Shared" state in which the first data may be shared among multiple processors. In the special state ""Modified & Shared"", the other processes may not have a valid copy of the first data. The first data is "Shared" in a sense that it is in both the LLC and the first processor at the present state, and "Modified" in a sense that the first data is still the updated. This distinction helps a subsequent process to decide whether it is necessary to invalidate the first data kept in other processors.

The process of committing the transaction as described above (including block S3) may further include the processes described below.

During the process of committing the transaction, assuming that the first processor performed a written operation on the first data during the transaction, the system may check each of the data indicator bits of the first data in the LLC directory to determine whether there are any other processors whose corresponding data indicator bit has a value "1", in addition to the first processor's data indicator bit (P1). If there is any, the system proceeds to invalidate the first data in those processors (other than the current first processor), and resets the corresponding data indicator bit (i.e., setting its value back to "0").

In this manner, regardless of whether the disclosed improved method is applied the first time on the first data, after committing the transaction, the state indicator in the first state index string (which corresponds to the first data) is always said to be "Modified & Exclusive". Further, among all data indicator bits, only the bit that is corresponding to the first processor has a value "1" to indicate that the first processor last modified the first data.

Below, three specific examples are described to illustrate the disclosed data processing method, in comparison to the existing methods.

In the first example, data processing is done in a regular way as found in the existing methods, as described below.

Assuming that the data has been modified, and after invalidating the data in all other CPU, only the private cache of CPU1 has the updated data. The LLC directory reflects the status that CPU1 has the updated data, and the current state of the data is "Modified". FIG. 4 shows the initial status of the state index string in the LLC directory, in which the state indicator is "Modified", only the data indicator bit P1 corresponding to CPU1 has a value "1", and all other data indicator bits have a value "0".

Figure 5:
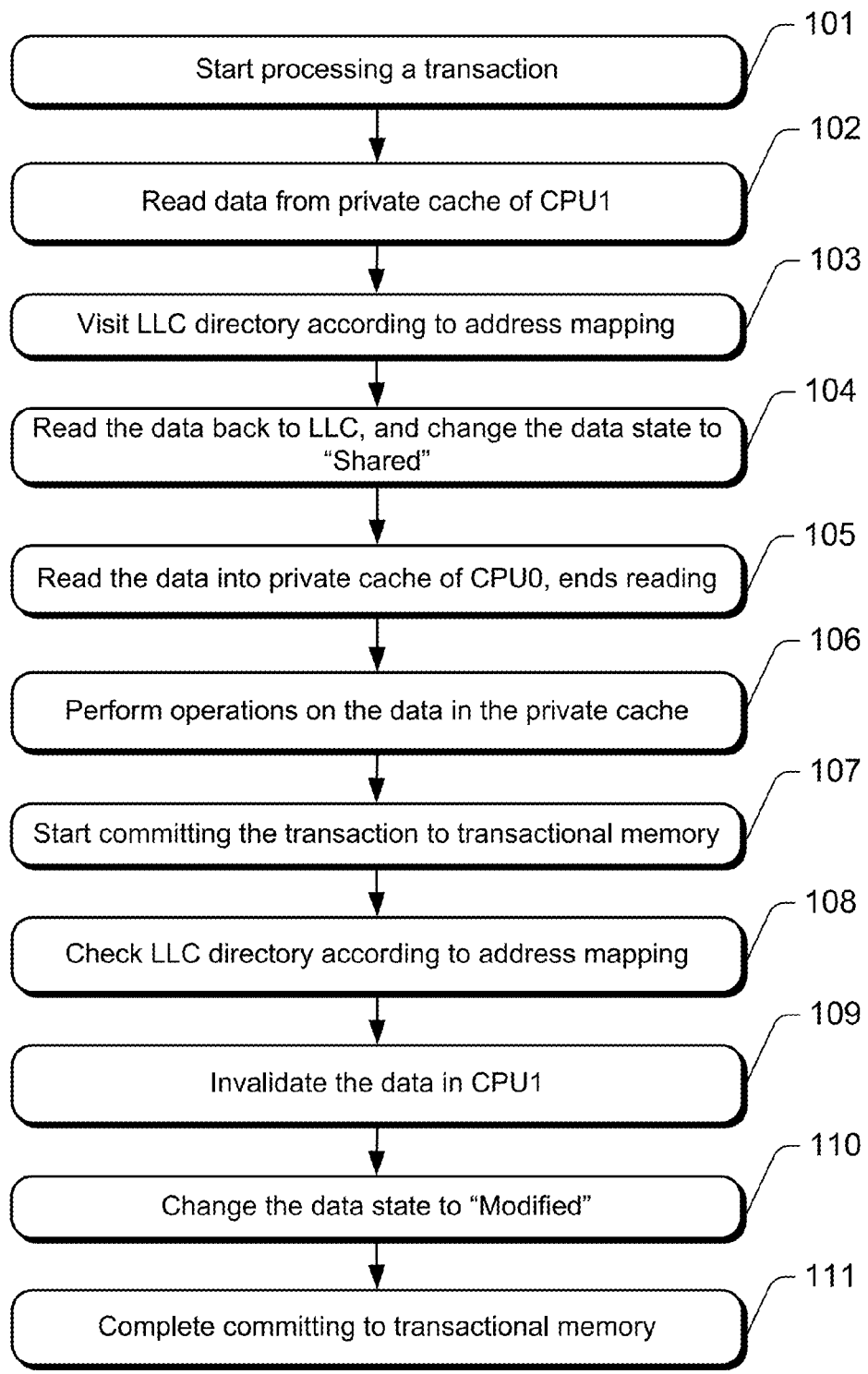
FIG. 5 is a block flow diagram illustrating the first process of the example embodiment.

FIG. 5 shows CPU0 performing the read-write operations in a transaction, including blocks 101-111.

At block 101, CPU0 starts to process the transaction.

At block 102, CPU0 first attempts to read the data in its own private cache.

At block 103, upon detecting that the private cache of CPU0 does not have the data, CPU0 visits the LLC directory according to the address mapping of the data.

At block 104, according to the LLC directory, the system determines that CPU1 has the updated data, and instructs CPU1 to write the data into the main memory. At the same time, the system also reads the data from the private cache of CPU1 to the LLC, sets the LLC directory state indicator of the cache line corresponding to the data to "Shared", sets data indicator bit P0 to "1" (along with data indicator bit P1 which should already be "1"), and sends the data from LLC to CPU0. FIG. 6 shows the current status of the state index string in the LLC directory.

At block 105, CPU0 saves the data to its private cache. The corresponding cache line now has the state "Shared". The data reading ends.

At block 106, CPU0 operates on the data in its private cache. Before the transaction is committed, the results of any write operations are not sent back to LLC to affect the global state.

At block 107, CPU0 starts to commit the result of the transaction to transaction memory system.

At block 108, because the cache line's state is "Shared" at this point, any write operation will require that the same data in the private caches of other CPUs be invalidated. To do this, CPU0 checks the LLC directory according to the address mapping of the data.

At block 109, based on the LLC directory, it is determined that CPU1 has a copy of the data. The data in the private cache of CPU1 is therefore invalidated, and the corresponding data indicator bit P1 is reset to value "0".

At block 110, the system sets the state index string of the corresponding cache line in the LLC directory. As shown in FIG. 7, the state indicator is set to be "Modified", and the data indicator bit P0 is "1", while all other data indicator bits are "0", indicating that the data is found at CPU0 only.

At block 111, the submitting the transaction to the transactional memory is complete.

To avoid conflicts, blocks 107-110 are combined in an atomic process when committed.

It can be seen that the state of the cache line in the private cache of CPU0 is "Modified" at end of this transaction. If subsequently CPU1 operates on the same data, the above process will need to be repeated, only with CPU0 and CPU1 exchanging their positions. Because the process involves one CPU visiting another CPU's private cache (including, for example, reading data from the other CPU and then invalidating the data the other CPU), the delay will increase as the number of CPU cores increases. This above-described first example illustrates an example process according to an existing transactional memory method.

In the second example, data processing is done in a different way in accordance with the present disclosure. The method seamlessly combines the pre-invalidation technique with transactional memory to speed up the transaction memory processes.

Still assume that initially the data is in the private cache of CPU1, with a state "Modified". The initial state index string of the data in the LLC directory is the same as that shown in FIG. 4.

Figure 8:
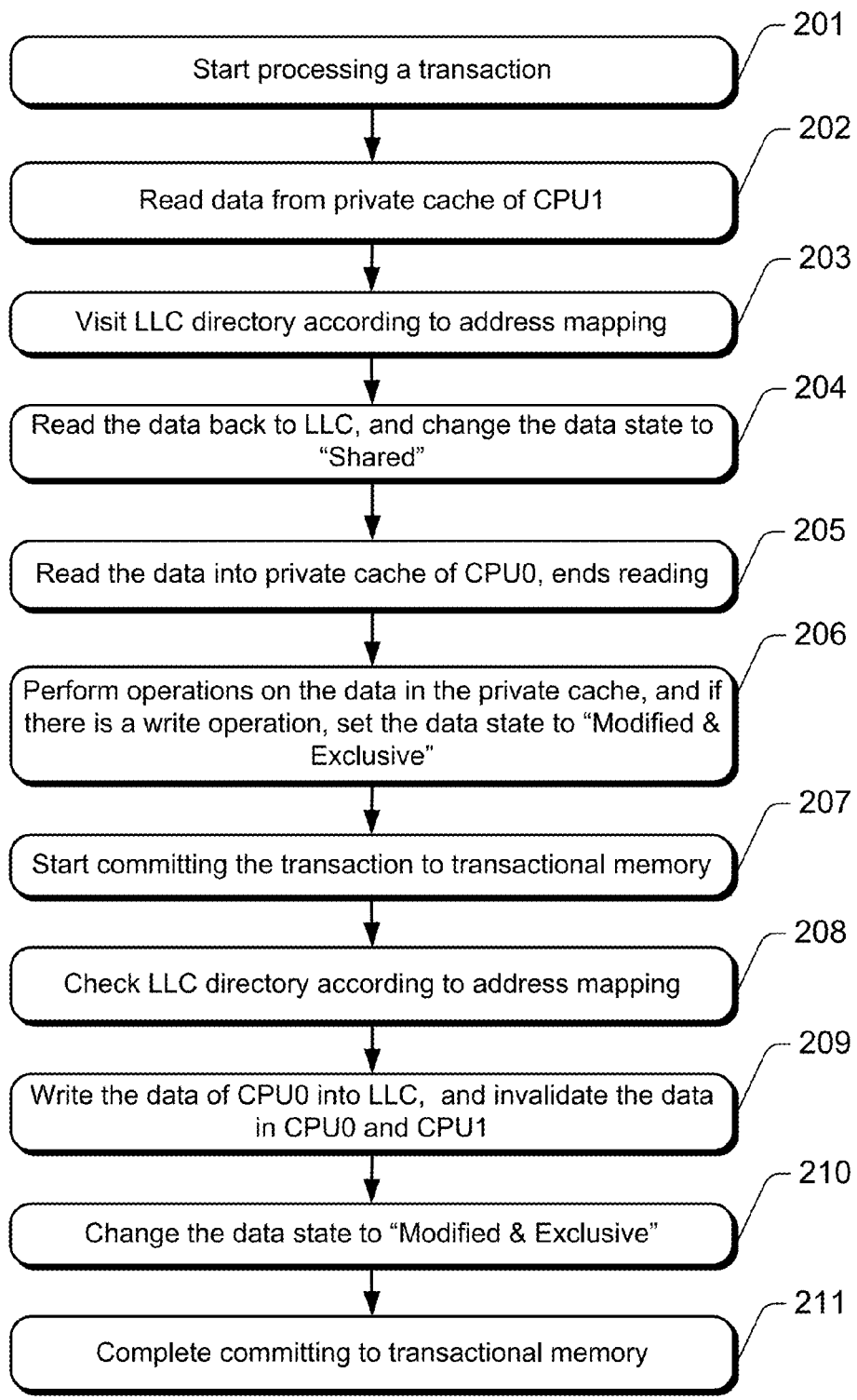
FIG. 8 is a block flow diagram illustrating a second process of the example embodiment.

FIG. 8 shows a block flow diagram of the data processing in the second example, including blocks 201-211.

Blocks 201-205 are the same as blocks 101-105. For example, at block 204, the cache line's state index string in the LLC directory is shown in FIG. 6. Namely, state indicator is set to "Shared", while the data indicator bits P0 and P1 are both "1".

At block 206, CPU0 operates on the data in its private cache. Before the transaction is committed, the results of any write operations are not sent back to LLC to affect the global state. If CPU0 performs only a read operation, the data in the private cache of CPU0 is set to state "Shared". If CPU0 performs a write operation, because CPU0 would see that the data was last modified by another CPU (CPU1 in this example), the data in the private cache of CPU0 is now set to a special state, for example, "Modified & Exclusive".

However, if the data was last modified by the same CPU (CPU0 in this example, not shown), the data in the private cache of CPU0 would be set to a regular state "Modified".

At block 207, CPU0 starts to commit the result of the transaction to transaction memory system.

At block 208, the system checks the LLC directory according to the address mapping of the data to perform invalidations. The cache line's state at this point has several possibilities, depending on the modification history and the operations in the transaction. If the transaction had only a read operation, the cache line's state would be "Shared". The system may invalidate the data in the private cache of CPU0, as the data kept at the previous processor (CPU1 in this example) which did the last modification remains updated. If the transaction had a write operation, the cache line's state at this point would be either "Modified & Exclusive" or "Modified", depending on the modification history prior to the write operation. In either case, the data in the private caches of the other processors may need to be invalidated.

At block 209, based on the LLC directory, it is determined that CPU1 has a copy of the data. The data in the private cache of CPU1 is therefore invalidated, and the corresponding data indicator bit P1 is reset to value "0".

If the cache line's state at this point is "Modified & Exclusive", it indicates that a predictive condition of modification history is met, and the system writes the data in the private cache of CPU0 (which has a state of "Modified & Exclusive") to the LLC, and invalidates the data in the private cache of CPU0. If the cache line state at this point is "Modified", the data is kept in the private cache of CPU0.

At block 210, the system sets, in the LLC directory, the state index string of the data on which CPU0 performed a write operation. As shown in FIG. 9, if the state of the data in the private cache of CPU0 is "Modified & Exclusive", the state indicator of the state index string in the LLC directory is also set to be "Modified & Exclusive"; if the state of the data in the private cache of CPU0 is "Modified", the state indicator of the state index string in the LLC directory is also set to be "Modified". In either case, the data indicator bit P0 is "1", indicating that the data is last modified by CPU0.

At block 211, the process of committing the transaction to the transactional memory is complete.

To avoid conflicts, blocks 207-211 are combined an atomic process when committed.

It can be seen that the data that just had a written operation is in LLC, and its state is "Modified & Exclusive" at end of this transaction. According to the data indicator bit value, the processor that the last modified the data is CPU0. However, because CPU0 does not have data, in subsequent CPU operations, the system does not need to invalidate the data CPU0. Besides, if another CPU needs to read the data, it can read it from the LLC directly, rather than requesting CPU0 to first write the data into LLC to be then read by the other CPU.

In the third example, additional data processing is done following the process in the above described second example, in accordance with the present disclosure.

Figure 10:
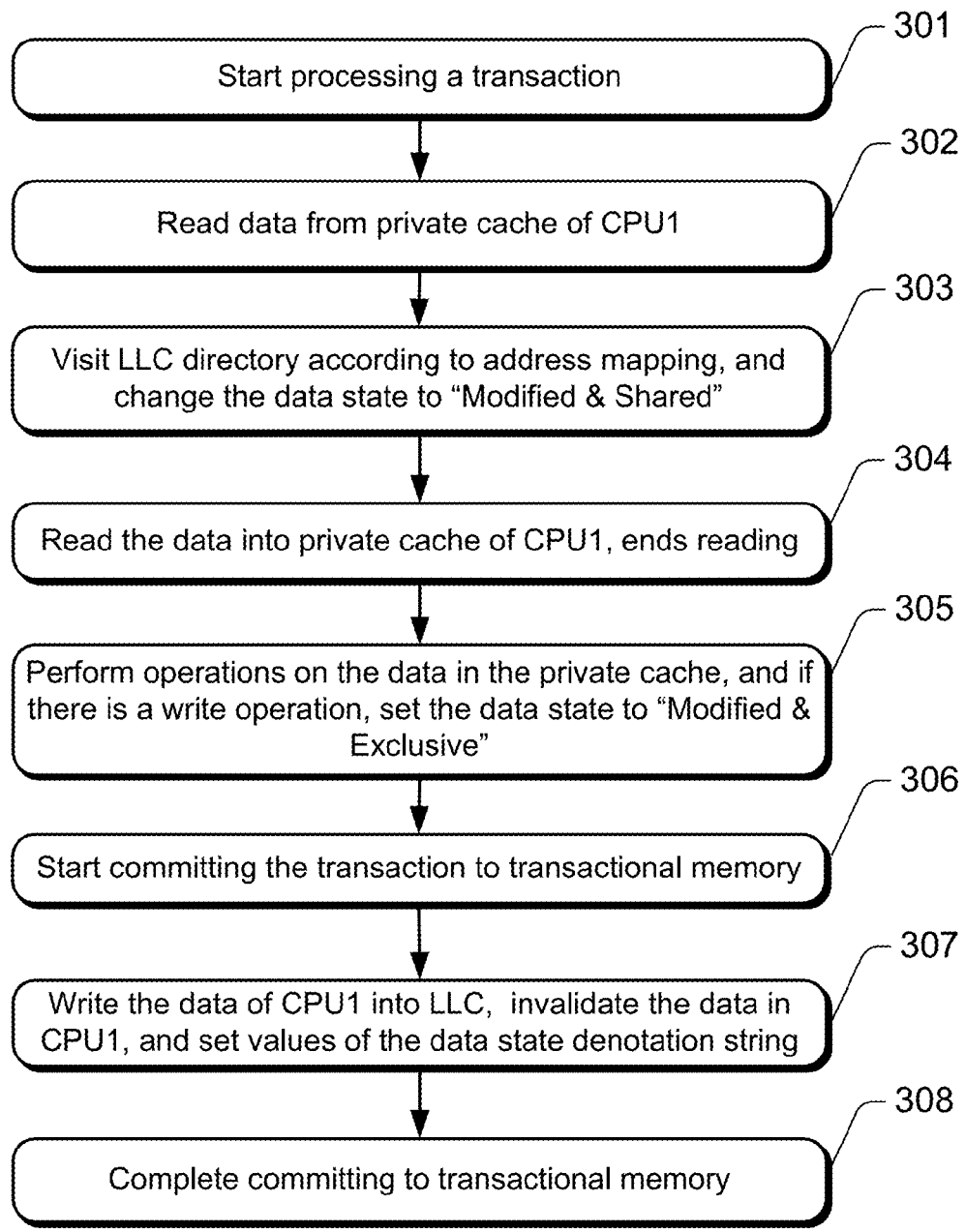
FIG. 10 is a block flow diagram illustrating a third process of the example embodiment.

FIG. 10 shows a block flow of the data processing in the third example, including blocks 301-308.

At Blocks 301, CPU1 starts to process a transaction.

At block 302, CPU1 first attempts to read the data in its own private cache.

Figures 11, 12, 13:
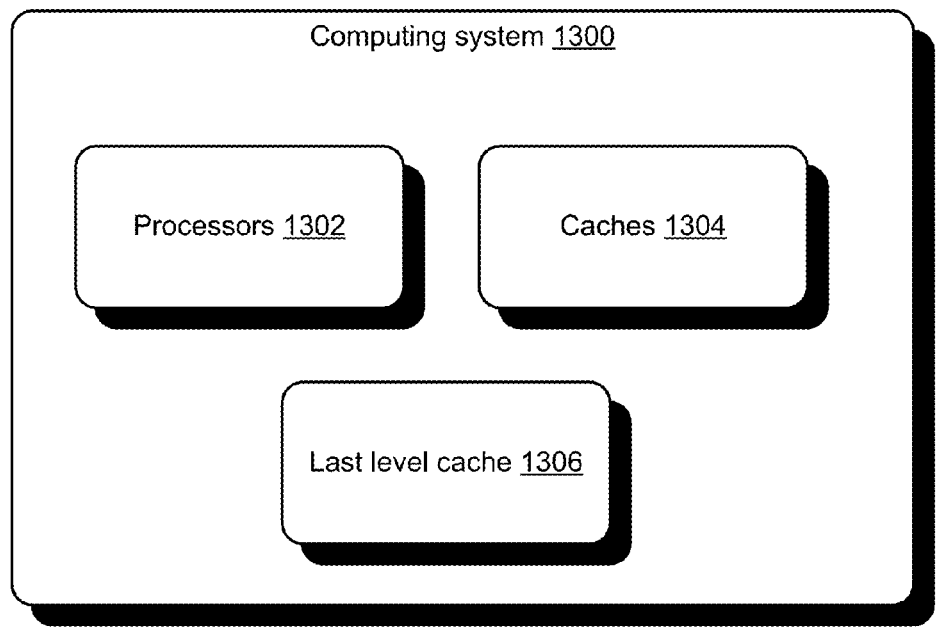
FIG. 11 is a block flow diagram of a cache line's data state index string in the directory of LLC at block 304 of the third process of an example embodiment.
FIG. 12 is a block flow diagram of a cache line's data state index string in the directory of LLC at block 310 of the third process of an example embodiment.
FIG. 13 is a structural diagram of a computing system that provides transactional memory.

At block 303, upon detecting that the private cache of CPU1 does not have the data, CPU1 visits the LLC directory according to the address mapping of the data. According to the state indicator of the cache line corresponding to the data that needs to be read, the state of the data is "Modified & Exclusive", last modified by CPU0. Because CPU1 needs to read the data, the system changes that state indicator of the cache line of the data to "Modified & Shared", and sets P1 as "1", and resets P0 as "0", as shown in FIG. 11.

At block 304, the data is saved in a private cache of CPU1. The data reading ends.

At block 305, CPU1 operates on the data in its private cache. Before the transaction is committed, all operations on the data happens in the private cache of CPU1, and the results of any write operations are not sent to LLC to affect the global state. If CPU1 performs only a read operation, the data in the private cache of CPU1 is set to state "Shared". If CPU1 performs a write operation, because CPU1 would see that the data was last modified by another CPU (CPU0 in this example), the data in the private cache of CPU1 is now set to a special state, for example, "Modified & Exclusive".

However, if the data was last modified by the same CPU (CPU1 in this example, not shown), the data in the private cache of CPU1 would be set to a regular state "Modified".

At block 306, CPU1 starts to commit the result of the transaction to transaction memory system.

At block 307, the system writes the data in CPU1 to the LLC, invalidates the data in CPU1, and sets the data state index string accordingly.

At this stage, the system may check the LLC directory according to the address mapping of the data to perform invalidations. The cache line's state at this point has several possibilities, depending on the modification history and the operations in the transaction. If the transaction had only a read operation, the system may invalidate the data in the private cache of CPU1, as the data kept at the previous processor (CPU0 in this example) that did the last modification remains updated. If the transaction had a write operation, the cache line's state at this point would be either "Modified & Exclusive" or "Modified", depending on the modification history prior to the write operation. In either case, the data in the private caches of the other processors may need to be invalidated. If the data's state index string in LLC indicates that except for P1 all other data indicator bits are "0", it means no other CPU has the data, and therefore there is no need to invalidate the data in the other CPUs.

In the case where the data state of the private cache of CPU1 is "Modified & Exclusive", the system decides to write the data in the private cache of CPU1 to the LLC, invalidates the data in CPU1. In case where the data state of the private cache of CPU1 is "Modified", the data is kept in the private cache of CPU1. In either case, the system sets the state indicator in the cache line's state index string in the LLC accordingly. In the first case, the state indicator is set to be "Modified & Exclusive" (as shown in FIG. 12), and in the second case, the state indicator is set to be "Modified". In both cases, P1 is "1", indicating that CPU1 was processor that last modified this data.

At block 308, the process of committing the transaction to the transactional memory is complete.

To avoid conflicts, blocks 306-308 are combined an atomic process when committed.

It can be seen that in the case where the data had a written operation, the modified data is now kept in LLC, and its state is "Modified & Exclusive" at end of this transaction. According to the data indicator bit value, the processor that the last modified the data is CPU1. However, because CPU1 does not have data, in subsequently CPU operations, the system does not need to invalidate the data CPU1. Besides, if another CPU needs to read the data, it can read it from the LLC directly, rather than requesting CPU1 to first write the data into LLC to be read by the other CPU.

In connection to the method disclosed herein, the present disclosure also provides a computing system for implementing the method described herein.

One aspect of this disclosure is a computing system 1300 for providing transactional memory as shown in FIG. 13. The computing system 1300 has a plurality of processors 1302 including at least a first processor and a second processor; a plurality of private caches 1304 each accessible by a respective one of the plurality of processors 1302; and a last level cache (LLC) 1306 shared among the plurality of processors 1302. The computing system 1300 is programmed to perform functions described herein in the context a method for transactional memory.

For example, the computing system 1300 is programmed to perform the following functions:

processing a transaction using the first processor, wherein the transaction includes reading first data into a private cache of the first processor, and performing a write operation on the first data in the private cache of the first processor; and committing the transaction to the transactional memory system, wherein the committing includes, in response to detecting a preset condition of recent modifications on the first data prior to the write operation, writing the first data in the private cache of the first processor into the LLC, and invalidating the first data in the private cache of the first processor.

An example of the preset condition of recent modifications is that prior to the write operation the first data was last modified by a second processor different from the first processor.

The function of committing the transaction further may further include setting a cache line state index string to indicate that the first data written into the LLC was last modified by the first processor.

In another embodiment, the function of committing the transaction may further include setting a cache line state index string to indicate a special state of the first data written in the LLC. The special state signals that the first data written in the LLC is modified and exclusive, and that the first data in the private cache of the first processor has been invalidated.

Because the details of the functions have been described herein in connection to the method of processing data using transactional memory, they are not repeated.

The functions may be realized using program modules or units, which may be implemented using computer programs based on machine executable commands and codes. Generally, a computer program may perform particular tasks or implement particular abstract data types of routines, programs, objects, components, data structures, and so on. Techniques described in the present disclosure can also be practiced in distributed computing environments, such a distributed computing environment, to perform the tasks by remote processing devices connected through a communication network. In a distributed computing environment, programmed modules or units may be located in either local or remote computer storage media including memory devices.

Various embodiments of the present specification are described progressively increased details with examples and environments. Each embodiment may focus a certain aspect of the disclosure, and therefore different embodiments may differ from one another, but may also share similar parts.

Exemplary embodiments are employed to illustrate the concept and implementation of the present invention in this disclosure. The exemplary embodiments are only used for better understanding of the method and the core concepts of the present disclosure. Based on the concepts in this disclosure, one of ordinary skills in the art may modify the exemplary embodiments and application fields.

What is claimed is:

1. A method for reducing data traffic among multiple processors with transactional memory for processing data, the method comprising:
    processing a transaction using a first processor, wherein the transaction includes:
        reading first data into a private cache of the first processor,
        upon detecting a preset condition of recent modifications on the first data,
            performing a write operation on the first data in the private cache of the first processor, and
            setting a cache line state index string to indicate a special state of the first data written in the private cache of the first processor, the special state signaling that the first data is modified and is to be exclusively written in a last level cache (LLC) when the transaction is committed;
    committing the transaction to a transactional memory system by writing the first data in the private cache of the first processor into the LLC accessible by the multiple processors, and invalidating the first data in the private cache of the first processor; and
    modifying the first data by modifying a copy of the first data in the LLC.

2. The method as recited in claim 1, wherein the preset condition of recent modifications comprises that, prior to the write operation, the first data was last modified by a second processor different from the first processor.

3. The method as recited in claim 1, wherein the committing the transaction further includes:
    setting the cache line state index string to indicate that the first data written into the LLC was last modified by the first processor.

4. The method as recited in claim 1, wherein the committing the transaction further includes:
    setting the cache line state index string to indicate a special state of the first data written in the LLC, the special state signaling that the first data written in the LLC is Modified & Exclusive and that the first data in the private cache of the first processor has been invalidated.

5. The method as recited in claim 1, wherein the committing the transaction further includes:
    setting the cache line state index string to indicate a state of the first data written in the LLC, the state matching a state of the first data in the private cache of the first processor.

6. The method as recited in claim 1, wherein the reading first data into the private cache of the first processor comprises:
    obtaining a state of the first data from a directory of the LLC;
    if the state is "Modified", identifying a processor which has an updated copy of the first data; and
    if the identified processor is a second processor different from the first processor, reading the first data from a private cache of the second processor to the LLC, setting the first data's state to be "Shared", reading the first data from the LLC to the private cache of the first processor, and setting the cache line state index string to indicate that the first processor has an updated copy of the first data.

7. The method as recited in claim 1, wherein the reading first data into the private cache of the first processor comprises:
    determining from a directory of the LLC a state of the first data, the state of being the special state signaling that the first data is last modified by a second processor, exclusive in the LLC, and that the first data in the private cache of the second processor has been invalidated;

reading the first data from the LLC to the private cache of the first processor; and setting the cache line state index string to indicate that the first processor has an updated copy of the first data.

8. The method as recited in claim 7, wherein the reading first data into the private cache of the first processor further comprises:

after reading the first data from the LLC to the private cache of the first processor, setting the cache line state index string to indicate that the first data is now in a state of "shared and modified".

9. A method for reducing data traffic among multiple processors with transactional memory for processing data, the method comprising:

processing a transaction using a first processor, wherein the transaction includes reading first data into a private cache of the first processor, and performing a write operation on the first data in the private cache of the first processor;

upon detecting that prior to the write operation the first data was last modified by a second processor different from the first processor, committing the transaction to a transactional memory system by writing the first data in the private cache of the first processor into a last level cache (LLC) accessible by the multiple processors, setting a cache line state index string to indicate that the first data written into the LLC was last modified by the first processor, and invalidating the first data in the private cache of the first processor; and modifying the first data by modifying a copy of the first data in the LLC.

10. The method as recited in claim 9, wherein the committing the transaction further includes:

setting the cache line state index string to indicate a special state of the first data written in the LLC, the special state signaling that the first data written in the LLC is Modified & Exclusive and that the first data in the private cache of the first processor has been invalidated.

11. The method as recited in claim 9, wherein the processing the transaction further includes:

when performing the write operation on the first data, upon detecting that prior to the write operation the first data was last modified by a second processor different from the first processor, setting the cache line state index string to indicate a special state of the first data written in the private cache of the first processor, the special state signaling that the first data is modified and is to be exclusively written in the LLC when the transaction is committed.

12. The method as recited in claim 9, wherein the committing the transaction further includes:

setting the cache line state index string to indicate a state of the first data written in the LLC, the state matching a state of the first data in the private cache of the first processor.

13. The method as recited in claim 9, wherein the reading first data into the private cache of the first processor comprises:

obtaining a state of the first data from a directory of the LLC, the state signaling that the first data is last modified by the second processor, exclusive in the LLC, and that the first data in the private cache of the second processor has been invalidated;

reading the first data from the LLC to the private cache of the first processor; and setting the cache line state index string to indicate that the first processor has an updated copy of the first data.

14. The method as recited in claim 13, wherein the reading first data into the private cache of the first processor further comprises:

after reading the first data from the LLC to the private cache of the first processor, setting the cache line state index string to indicate that the first data is now in a state of "shared and modified".

15. A computing system for reducing data traffic among multiple processors with transactional memory for processing data, the computer system comprising:

a plurality of processors including at least a first processor and a second processor;

a plurality of private caches each accessible by a respective one of the plurality of processors; and a last level cache (LLC) shared among the plurality of processes, wherein the plurality of processors, the plurality of private caches, and the LLC are programmed to perform functions comprising:

processing a transaction using the first processor, wherein the transaction includes:

reading first data into a private cache of the first processor, upon detecting a preset condition of recent modifications on the first data, performing a write operation on the first data in the private cache of the first processor, and setting a cache line state index string to indicate a special state of the first data written in the private cache of the first processor, the special state signaling that the first data is modified and is to be exclusively written in a last level cache (LLC) when the transaction is committed, committing the transaction to a transactional memory system by writing the first data in the private cache of the first processor into the LLC, and invalidating the first data in the private cache of the first processor; and modifying the first data by modifying a copy of the first data in the LLC.

16. The computing system as recited in claim 15, wherein the preset condition of recent modifications comprises that, prior to the write operation, the first data was last modified by a second processor different from the first processor.

17. The computing system as recited in claim 15, wherein the committing the transaction further includes:

setting the cache line state index string to indicate that the first data written into the LLC was last modified by the first processor.

18. The computing system as recited in claim 15, wherein the committing the transaction further includes:

setting the cache line state index string to indicate a special state of the first data written in the LLC, the special state signaling that the first data written in the LLC is Modified & Exclusive and that the first data in the private cache of the first processor has been invalidated.

19. The computing system as recited in claim 15, wherein the reading first data into the private cache of the first processor comprises:

determining from a directory of the LLC a state of the first data, the state of being a special state signaling that the first data is last modified a second processor, exclusive in the LLC, and that the first data in the private cache of the second processor has been invalidated;

reading the first data from the LLC to the private cache of the first processor; and setting the cache line state index string to indicate that the first processor has an updated copy of the first data.

20. The computing system as recited in claim 19, wherein the reading first data into the private cache of the first processor further comprises:

after reading the first data from the LLC to the private cache of the first processor, setting the cache line state index string to indicate that the first data is now in a state of "shared and modified".

* * * * *